US008656098B1

(12) United States Patent
Stern

(10) Patent No.: US 8,656,098 B1
(45) Date of Patent: Feb. 18, 2014

(54) SYSTEM AND METHOD FOR ACTIVATING A RAID DISK

(75) Inventor: Richard M. Stern, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1680 days.

(21) Appl. No.: 11/830,175

(22) Filed: Jul. 30, 2007

(51) Int. Cl.
*G06F 12/16* (2006.01)

(52) U.S. Cl.
USPC ............... 711/114; 711/4; 711/111; 711/112

(58) Field of Classification Search
USPC ............... 711/117, 4, 111, 112, 114
See application file for complete search history.

(56) References Cited

U.S. PATENT DOCUMENTS

| | | | |
|---|---|---|---|
| 6,854,035 B2 * | 2/2005 | Dunham et al. | 711/117 |
| 6,924,780 B1 * | 8/2005 | Horst et al. | 345/82 |
| 7,058,858 B2 | 6/2006 | Wong et al. | |
| 7,171,514 B2 | 1/2007 | Coronado et al. | |
| 7,237,063 B2 | 6/2007 | Miki | |
| 2003/0167327 A1 * | 9/2003 | Baldwin et al. | 709/225 |
| 2003/0172239 A1 * | 9/2003 | Swank | 711/163 |
| 2006/0095662 A1 * | 5/2006 | Arnott | 711/114 |

OTHER PUBLICATIONS

LVM HOWTO; Lewis, AJ; Rackable Systems; Nov. 27, 2006.*
The Software-RAID HOWTO; Ostergaard et al.; Jun. 3, 2004.*
LVM Configuration; NONGNU.org; published May 2, 2007.*
Lewis, A.J., LVM HOWTO, Nov. 27, 2006, pp. 1-65, Rackable Systems, Inc., <http://www.tldp.org/HOWTO/LMV-HOWTO.html>.
Ostergaard et al., Software- RAID-HOWTO, Jun. 3, 2004, v1.1, pp. 1-40.Jakob <http://unthught.net/Software-RAID.HOWTO/>.

* cited by examiner

*Primary Examiner* — Sanjiv Shah
*Assistant Examiner* — Samuel Dillon

(57) ABSTRACT

A method is provided that includes performing first and second exclusive activation checks separately on first and second storage units, respectively, with a node using a software RAID function and activating a RAID disk with the first storage unit and the second storage unit using the software RAID function in response to the first and the second exclusive activation checks indicating that the first and the second storage units, respectively, can be activated as the RAID disk by the node.

20 Claims, 2 Drawing Sheets

SYSTEM AND METHOD FOR ACTIVATING A RAID DISK

BACKGROUND OF THE INVENTION

Processing systems may be grouped together into a cluster to provide services to various users. The services typically include data sharing to allow the users in the cluster to collaborate and exchange information. To increase the reliability of shared data, disk drives that store the data in a cluster may be operated as a RAID system where RAID stands for "Redundant Array of Inexpensive Disks". A RAID system may store multiple copies of data across different disk drives to prevent data from being lost in the event of a failure of a single disk drive. In a cluster environment, however, multiple processing systems may have the ability to operate disk drives as a RAID system. If these processing systems do not properly coordinate the use of the disk drives in a RAID system, data corruption may occur.

SUMMARY OF THE INVENTION

According to an exemplary embodiment, the present disclosure provides a method that includes performing first and second exclusive activation checks separately on first and second storage units, respectively, with a node using a software RAID function and activating a RAID disk with the first storage unit and the second storage unit using the software RAID function in response to the first and the second exclusive activation checks indicating that the first and the second storage units, respectively, can be activated as the RAID disk by the node.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

According to one embodiment of the present disclosure, a method, system and program product for activating a RAID disk in a cluster is provided. Before activating a pair of storage units as a RAID disk, a node in the cluster separately ensures that each storage unit is able to be activated as part of the RAID disk. To do so, the node activates each storage unit in turn as a RAID disk. Subsequent to activating a storage unit, the node accesses a tag of the storage unit to determine whether the storage unit is able to be activated as part of the RAID disk and then deactivates the storage unit. The node activates a RAID disk with both storage units only after determining that both storage units are able to be activated as the RAID disk. By doing so, the node may properly activate the RAID disk without initiating an undesired synchronization process.

Figure 1:
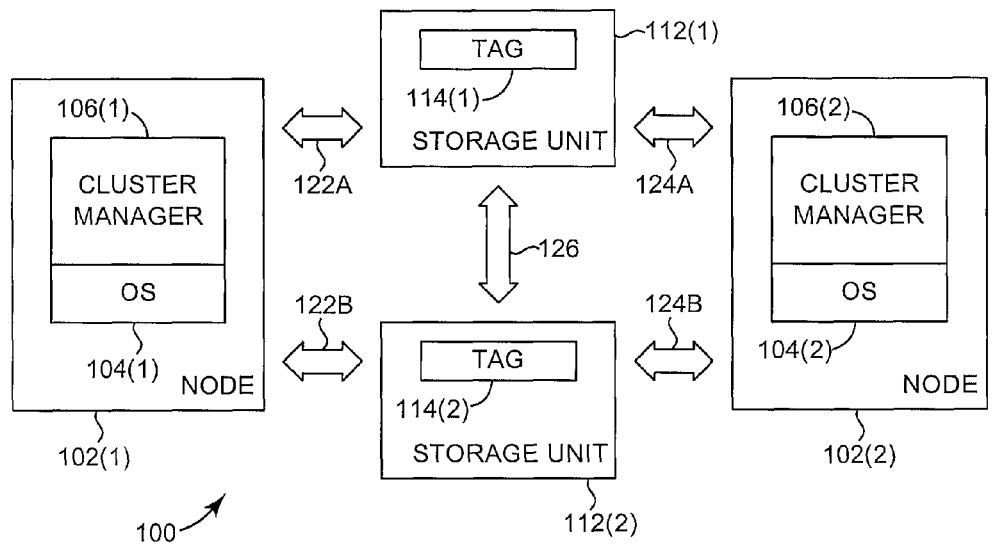
FIG. 1 is a block diagram illustrating one embodiment of a cluster.

FIG. 1 is a block diagram illustrating one embodiment of a cluster 100. Cluster 100 includes at least two nodes 102(1) and 102(2) and at least two storage units 112(1) and 112(2). Nodes 102(1) and 102(2) include operating systems (OS) 104(1) and 104(2), respectively, and cluster managers 106(1) and 106(2), respectively.

Cluster 100 provides services to various clients or users (not shown in FIG. 1) including data sharing to allow the clients in the cluster to collaborate and exchange information. Cluster 100 may be configured as a highly available extended distance cluster with redundant hardware and software components to prevent isolated component failures from disrupting the services provided by cluster 100. Cluster 100 provides data replication on the extended distance cluster by creating software RAID disks as will be described in additional detail below.

Each node 102 includes any suitable processing system configured to execute operating system 104, cluster manager 106, and any other suitable applications (not shown). Each node 102 includes any suitable number of processors (not shown) and any suitable amount of volatile or non-volatile memory (not shown) where the processors and memory are configured to execute operating system 104, cluster manager 106, and any other applications.

Operating system 104, cluster manager 106, and any other applications each include a set of instructions that are executable by a node 102 for causing functions to be performed by node 102. The sets of instructions are each stored in any suitable portable or non-portable medium such that the sets of instructions are accessible by node 102. As used herein the term program product refers to the combination of a set of instructions and the medium that stores the set of instructions.

In one embodiment, operating systems 104(1) and 104(2) are each the Linux Operating System and cluster managers 106(1) and 106(2) are each Serviceguard from Hewlett-Packard Company. In other embodiments, other operating systems and/or other cluster managers may be used.

Nodes 102(1) and 102(2) may be in the same physical location or in separate physical locations. Nodes 102(1) and 102(2) are configured to communicate with each other using any suitable wired or wireless connection (not shown). Nodes 102(1) and 102(2) are configured to share resources such as storage units 112(1) and 112(2).

In one embodiment, nodes 102(1) and 102(2) are configured to operate as servers that provide services to client processing systems (not shown). Node 102(1) accesses storage units 112(1) and 112(2) as indicated by arrow 122A and 122B to provide data from the clients to storage units 112(1) and 112(2) and from storage units 112(1) and 112(2) to the clients. Similarly, node 102(2) accesses storage units 112(1) and 112(2) as indicated by arrow 124A and 124B to provide data from the clients to storage units 112(1) and 112(2) and from storage units 112(1) and 112(2) to the clients. Arrows 122A, 122B, 124A, and 124B represent any suitable wired or wireless connections where each connection may be a direct connection (e.g., a point-to-point connection) or an indirect connection with any number of intermediate processing or network devices between a node 102 and a storage unit 112.

Storage units 112(1) and 112(2) are configured to store information received from nodes 102 and provide stored information to nodes 102. Each storage unit 112(1) and 112(2) is a disk drive in one embodiment. Each disk drive has any suitable interface such as a FibreChannel, an IDE, or a SCSI interface. Storage units 112(1) and 112(2) may be in the same physical location or in separate physical locations.

Cluster 100 operates storage units 112(1) and 112(2) as a RAID disk in a RAID-1 setup. To do so, cluster manager 106 in one of nodes 102(1) or 102(2) activates the RAID disk storage units 112(1) and 112(2) by executing a software RAID function. The software RAID function causes storage units 112(1) and 112(2) to mirror one another as indicated by an arrow 126. While operating, the software RAID function continuously or periodically synchronizes storage units 112(1) and 112(2) to maintain data coherency. Accordingly, storage units 112(1) and 112(2) each include a copy of the same data when fully synchronized. By operating storage units 112(1) and 112(2) as a RAID disk, the data in storage units 112(1) and 112(2) may be shared by nodes 102(1) and 102(2). Cluster managers 106(1) and 106(2) ensure that nodes 102(1) and 102(2) access the RAID disk at different times.

In embodiments where operating systems 104(1) and 104(2) are the Linux Operating System, the software RAID function may be included in a set of kernel modules, including the MD kernel extension and associated tools, which operate in conjunction with management utilities in cluster managers 106(1) and 106(2). In these embodiments, the RAID disk that includes storage units 112(1) and 112(2) forms a block device. The set of kernel modules forms the Linux RAID subsystem and is implemented as a layer in the kernel that sits above the low-level disk drivers and the block-device interface. The Linux RAID subsystem is not normally aware that the RAID disk includes shared storage units 112(1) and 112(2) in cluster 100. As will be described in additional detail below, nodes 102(1) and 102(2) are configured to perform exclusive activation checks to ensure that an undesired synchronization does not occur in response to activating the RAID disk with storage units 112(1) and 112(2) subsequent to one of storage units 112(1) and 112(2) being deactivated by a failure.

Cluster manager 106 builds a volume group (VG) on the RAID disk with storage units 112(1) and 112(2) using LVM2 (Logical Volume Manager), as defined in the Linux 2.6 kernel series. With LVM2, the volume group (VG) includes a physical volume (PV) with the RAID disk so that the RAID disk appears as a block device to nodes 102(1) and 102(2). Subsequent to starting the RAID disk, cluster manager 106 in the node 102 that activated the RAID disk activates the volume group.

Node 102(1) and 102(2) enable activation protection with LVM2 to cause tags 114(1) and 114(2) to be stored on storage units 112(1) and 112(2), respectively. To do so, each node 102(1) and 102(2) performs the following steps. Each node 102(1) and 102(2) edits etc/lvm/lvm.conf to add "tags {host-tags=1}". Each node 102(1) and 102(2) also creates the file "etc//lvm/lym$(uname-n).conf and adds the line "activation {volume_list=["@node"]}" to the file where node is the value of uname-n (i.e., an identifier that identifies node 102(1) or 102(2)). Each node 102(1) and 102(2) then runs vgscan. When a cluster manager 106 activates a volume group, cluster manager 106 causes tags 114(1) and 114(2) to be stored on storage units 112(1) and 112(2), respectively, with the identifier that identifies the node 102 that activated the volume group.

When storage unit 112(1) or 112(2) fails, the node 102 that activated the volume group may deactivate the failing storage unit 112 from the RAID disk. If node 102 attempts to reactivate the RAID disk with storage units 112(1) and 112(2), an undesired synchronization process may be initiated if the other node 102 is accessing data from the RAID disk. If a synchronization process occurs when the other node 102 is accessing data from the RAID disk, data corruption may occur in storage unit 112(1) or 112(2).

Figures 2, 3A, 3B:
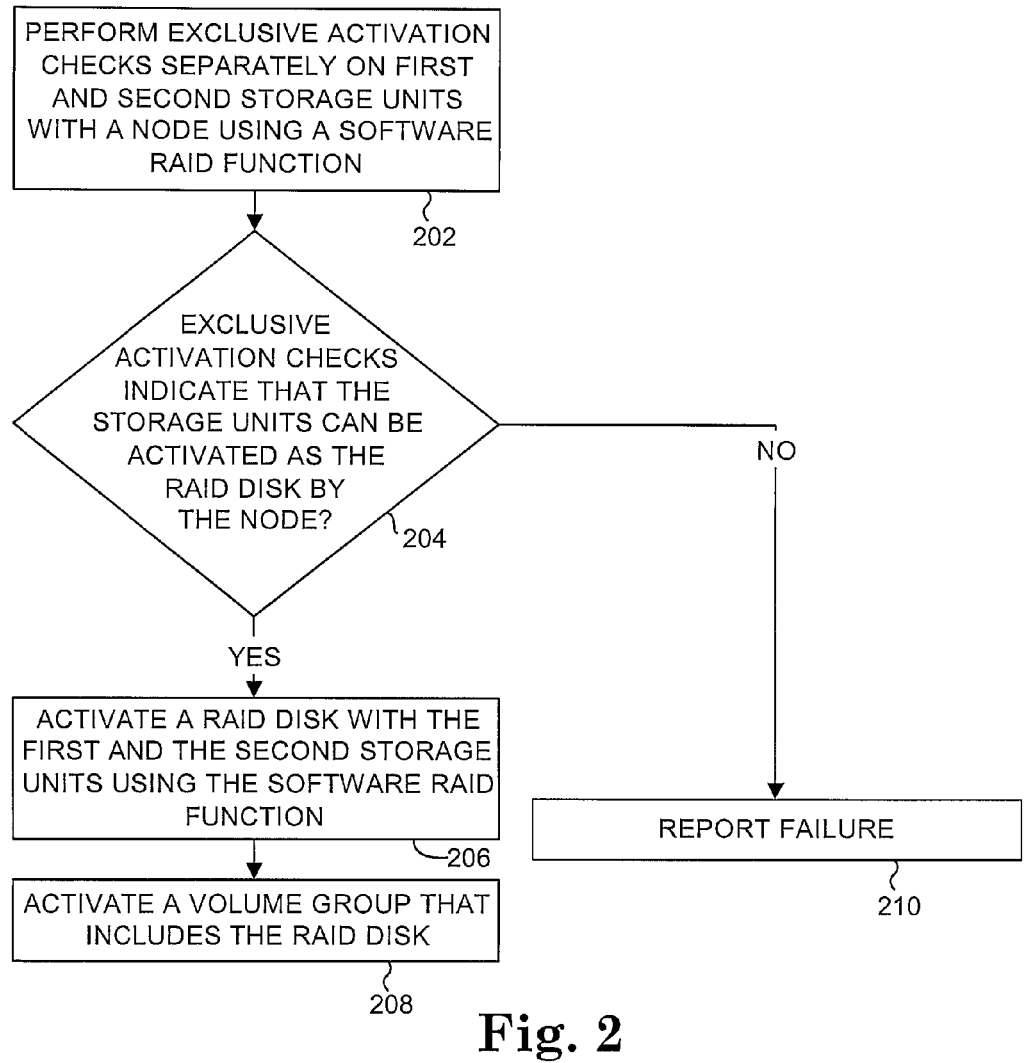
FIG. 2 is a flow chart illustrating one embodiment of a method for activating a RAID disk in a cluster.
FIGS. 3A-3B are block diagrams illustrating examples of activation criteria.

FIG. 2 is a flow chart illustrating one embodiment of a method for activating a RAID disk in cluster 100 to prevent data corruption from occurring. The method of FIG. 2 is performed by a node 102 in response to a storage unit 112(1) or 112(2) failing and being deactivated as part of the RAID disk. Although each of nodes 102(1) and 102(2) is configured to perform the method of FIG. 2 in one embodiment, the following description will describe the method as being performed by node 102(1) for illustrative purposes.

Node 102(1) performs exclusive activation checks separately on 112(1) and 112(2) using a software RAID function as indicated in a block 202. Cluster manager 106(1) performs separate exclusive activation checks on storage units 112(1) and 112(2) to verify that node 102(2) is not accessing data from the RAID disk prior to reactivating the RAID disk with storage units 112(1) and 112(2).

Cluster manager 106(1) performs the exclusive activation checks by accessing tags 114(1) and 114(2) to determine whether node 102(2) owns storage unit 112(1) or 112(2). To gain access to tag 114(1), cluster manager 106(1) activates the RAID disk with only storage unit 112(1) using the software RAID function. Similarly, cluster manager 106(1) activates the RAID disk with only storage unit 112(2) to gain access to tag 114(2) using the software RAID function. Cluster manager 106(1) deactivates the RAID disk with storage unit 112(1) subsequent to accessing tag 114(1), and cluster manager 106(1) deactivates the RAID disk with storage unit 112(2) subsequent to accessing tag 114(2).

Because each storage unit 112(1) and 112(2) is activated as the RAID disk separately, the software RAID function used to activate each storage unit 112(1) and 112(2) as the RAID disk does not initiate a synchronization process and, therefore, does not corrupt the data on storage unit 112(1) or 112(2).

A determination is made by node 102(1) as to whether the exclusive activation checks indicate that storage units 112(1) and 112(2) can be activated as the RAID disk by node 102(1) as indicated in a block 204. With activation protection enabled, LVM2 does not allow node 102(1) to activate a volume group on a RAID disk with storage units 112(1) and 112(2) unless storage units 112(1) and 112(2) are unassigned, owned by node 102(1), or can be changed to unassigned because node 102(2) has failed. By accessing tag 114(1), cluster manager 106(1) determines whether tag 114(1) indicates that storage unit 112(1) is unassigned, owned by node 102(1), or owned by node 102(2) where node 102(2) has failed. Similarly, cluster manager 106(1) determines whether tag 114(2) indicates that storage unit 112(2) is unassigned, owned by node 102(1), or owned by node 102(2) where node 102(2) has failed by accessing tag 114(2). If either of storage units 112(1) and 112(2) are owned by node 102(2), then node 102(1) will not be able to activate a volume group on a RAID disk with storage units 112(1) and 112(2) unless node 102(2) has failed. If node 102(2) has failed, node 102(1) changes any of tags 114(1) and 114(2) that identify failed node 102(2) as the owner to unassigned because node 102(2), by virtue of failing, is no longer considered part of cluster 100 and a node that is not longer part of cluster 100 is guaranteed to no longer have ownership of storage unit 112(1) or 112(2).

FIGS. 3A-3B are block diagrams illustrating examples of activation criteria. In the example of FIG. 3A, tag 114(1) indicates that storage unit 112(1) is owned by node 102(1) and tag 114(2) indicates that that storage unit 112(2) is unassigned. Accordingly, the exclusive activation checks indicate that storage units 112(1) and 112(2) can be activated as the RAID disk by node 102(1).

In the example of FIG. 3B, tag 114(1) indicates that storage unit 112(1) is owned by node 102(2) and tag 114(2) indicates that storage unit 112(2) is owned by node 102(2). Accordingly, the exclusive activation checks indicate that storage units 112(1) and 112(2) cannot be activated as the RAID disk by node 102(1) because storage units 112(1) and 112(2) are owned by node 102(2).

If node 102(2) has failed, however, node 102(1) changes tags 114(1) and 114(2) to unassigned. Accordingly, the exclusive activation checks indicate that storage units 112(1) and 112(2) can be activated as the RAID disk by node 102(1) if node 102(2) has failed.

If the exclusive activation checks indicate that storage units 112(1) and 112(2) can be activated as the RAID disk by node 102(1), then node 102(1) activates the RAID disk with storage units 112(1) and 112(2) using the software RAID function as indicated in a block 206. Because the exclusive activation checks determined that node 102(2) does not own storage units 112(1) and 112(2), node 102(2) cannot access storage unit 112(1) or 112(2) while node 102(1) activates the RAID disk. As a result, any synchronization process performed by the software RAID function will not conflict with node 102(2) accessing storage unit 112(1) or 112(2) and will not cause data corruption. Node 102(1) activates a volume group that includes the RAID disk subsequent to activating the RAID disk as indicated by a block 208.

If one or both of the exclusive activation checks indicate that storage units 112(1) and 112(2) cannot be activated as the RAID disk by node 102(1), then node 102(1) does not activate the RAID disk with both storage units 112(1) and 112(2) using the RAID function and reports a failure as indicated in a block 210. In this case, the exclusive activation checks determined that node 102(2) owns one or both of storage units 112(1) and 112(2). Any synchronization process performed by a software RAID function could conflict with node 102(2) accessing storage unit 112(1) or 112(2) and could cause data corruption. Accordingly, node 102(1) does not activate the RAID disk with storage units 112(1) and 112(2) using the RAID function to prevent an undesired synchronization process from occurring.

Where one of storage units 112(1) and 112(2) has failed and is unavailable, node 102(1) may activate the RAID disk with of the available storage unit 112(1) or 112(2) using the RAID function where the exclusive activation checks indicate that the available storage unit 112(1) or 112(2) can be activated as the RAID disk by node 102(1).

Figure 4:
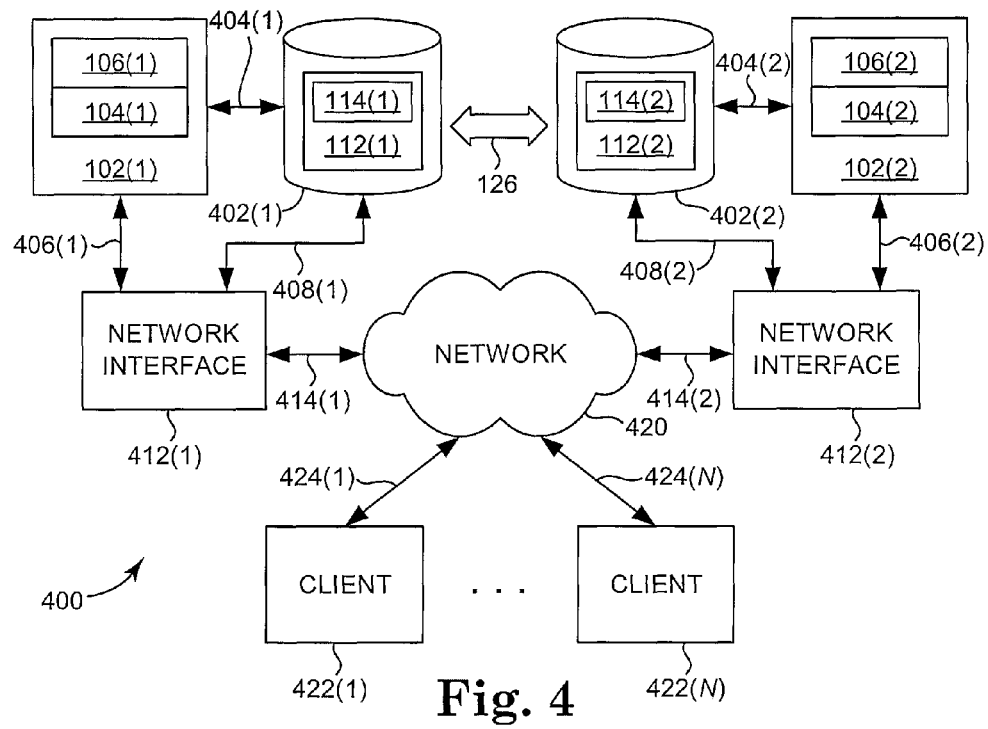
FIG. 4 is a block diagram illustrating another embodiment of a cluster.

FIG. 4 is a block diagram illustrating another embodiment of a cluster 400. Cluster 400 includes nodes 102(1) and 102(2), disk arrays 402(1) and 402(2) with storage units 112(1) and 112(2), network interfaces 412(1) and 412(2), a network 420, and clients 422(1) to 422(N) where N is greater than or equal to one.

Nodes 102(1) and 102(2) operate as servers in cluster 400 and operate a mirrored RAID disk with storage units 112(1) and 112(2) as indicated by an arrow 126 and as described above with reference to FIGS. 1-3B. Node 102(1) accesses the RAID disk directly using a connection 404(1) or indirectly using a connection 406(1) to network interface 412(1), a connection 414(1) between network interface 412(1) and network 420, a connection 414(2) between network 420 and network interface 412(2), and a connection 408(2) between network interface 412(2) and the RAID disk. Node 102(2) accesses the RAID disk directly using a connection 404(2) or indirectly using a connection 406(2) to network interface 412(2), connection 414(2) between network interface 412(2) and network 420, connection 414(1) between network 420 and network interface 412(1), and a connection 408(1) between network interface 412(1) and the RAID disk. Clients 422(1) to 422(N) access nodes 102(1) and 102(2) to store information to and receive information from disk arrays 402(1) and 402(2) across network 420 using connections 424(1) to 424(N), respectively. Each of the connections in cluster 400 may be any suitable wired or wireless connection such as a FibreChannel connection or an Ethernet connection.

In other embodiments, cluster 400 may include other additional nodes and/or additional storage systems.

The embodiments described above effectively delay the activation of a software RAID disk until a lock status, i.e., the LVM2 tags, of each storage unit of the RAID disk can be determined. The lock statuses are checked by separately activating the storage units to allow access to the LVM2 tags. The lock statuses indicate whether the storage units can be activated in a volume group by a node, and the software RAID disk is activated based on the lock statuses. By using the lock status that can be determined from the LVM2 tags, the embodiments described above effectively create a lock mechanism for a software RAID function by using a lock mechanism from LVM2. In other embodiments where other operating systems are used, other functions may be used may be used to provide a lock mechanism for a software RAID function.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method comprising:
performing first and second exclusive activation checks separately on first and second storage units, respectively, with a first node using a software RAID function; and
activating a RAID disk with the first storage unit and the second storage unit using the software RAID function in response to the first and the second exclusive activation checks indicating that the first and the second storage units, respectively, can be activated as the RAID disk by the first node.

2. The method of claim 1 further comprising:
performing the first and the second exclusive activation checks in response to at least one of the first and the second storage units being deactivated as part of the RAID disk.

3. The method of claim 1 further comprising:
activating a volume group that includes the RAID disk subsequent to activating the RAID disk.

4. The method of claim 1 further comprising:
executing a Linux Operating System on the first node.

5. The method of claim 1 further comprising:
accessing first and second tags on the first and the second storage units, respectively, to determine whether the first and the second exclusive activation checks indicate that the first and the second storage units, respectively, can be activated as the RAID disk by the first node.

6. The method of claim 5 further comprising:
determining that the first exclusive activation check indicates that the first storage unit can be activated as a first part of the RAID disk by the first node in response to the first tag indicating that the first storage unit is unassigned, owned by the first node, or owned by a second node that has failed.

7. The method of claim 6 further comprising:
determining that the second exclusive activation check indicates that the second storage unit can be activated as a second part of the RAID disk by the first node in response to the second tag indicating that the second storage unit is unassigned, owned by the first node, or owned by a second node that has failed.

8. The method of claim 1 further comprising:
not activating the RAID disk with the first storage unit and the second storage unit using the RAID function in response to either the first or the second exclusive activation check indicating that the first or the second storage unit, respectively, cannot be activated as the RAID disk by the first node.

9. The method of claim 1 further comprising:
mirroring the first and the second storage units in response to activating the RAID disk.

10. A system comprising:
first and second physical storage units; and
at least a first node configured to activate the first and the second physical storage units separately with a software RAID function and activate a RAID disk with the first and the second physical storage units with the software RAID function in response to determining that the first and the second physical storage units are each able to be activated with the software RAID function by the first node without initiating an undesired synchronization process.

11. The system of claim 10 wherein the first node is configured to deactivate each of the first and the second physical storage units prior to activating the RAID disk with the first and the second physical storage units.

12. The system of claim 11 wherein the first node is configured to access first and second tags on the first and the second physical storage units, respectively, to determine whether the first and the second physical storage units, respectively, are able to be activated by the first node without initiating the undesired synchronization process.

13. The system of claim 12 wherein the first node is configured to determine that the first physical storage unit is able to be activated by the first node in response to the first tag indicating that the first physical storage unit is unassigned, owned by the first node, or owned by a second node that has failed.

14. The system of claim 10 wherein the first node is configured to execute a Linux Operating System.

15. The system of claim 14 wherein the first node is configured to activate a volume group that includes the RAID disk subsequent to activating the RAID disk with the first and the second physical storage units with the software RAID function.

16. The system of claim 10 wherein the first node is configured to cause the first and the second physical storage units to be mirrored in response to activating the RAID disk with the first and the second physical storage units.

17. A program product comprising:
a set of instructions executable by a node for causing the node to:
perform first and second exclusive activation checks separately on first and second storage units, respectively, with a first node using a software RAID function; and
activate a RAID disk with the first storage unit and the second storage unit using the software RAID function in response to the first and the second exclusive activation checks indicating that the first and the second storage units, respectively, can be activated as the RAID disk by a first node; and
a non-transitory computer readable storage medium that stores the set of instructions so that the set of instructions is accessible by the node.

18. The program product of claim 17 wherein the set of instructions is executable by the node for causing the node to perform the first exclusive activation check by activating the first storage unit, accessing a first tag stored on the first storage unit, and deactivating the first storage unit prior to activating the RAID disk with the first storage unit and the second storage unit using the software RAID function.

19. The program product of claim 18 wherein the set of instructions is executable by the node for causing the node to perform the second exclusive activation check by activating the second storage unit, accessing a second tag stored on the second storage unit, and deactivating the second storage unit prior to activating the RAID disk with the first storage unit and the second storage unit using the software RAID function.

20. The program product of claim 17 wherein the set of instructions is executable by the node for causing the node to perform the first and the second exclusive activation checks in response to at least one of the first and the second storage units being deactivated as part of the RAID disk.

* * * * *